United States Patent
Jiang

(10) Patent No.: US 11,751,314 B2
(45) Date of Patent: Sep. 5, 2023

(54) VISUALIZED LIGHT ADJUSTMENT METHOD AND SYSTEM

(71) Applicant: Guangzhou Haoyang Electronic Co., Ltd., Guangdong (CN)

(72) Inventor: Weikai Jiang, Guangdong (CN)

(73) Assignee: GUANGZHOU HAOYANG ELECTRONIC CO., LTD., Guangdong (CN)

( * ) Notice: Subject to any disclaimer, the term of this patent is extended or adjusted under 35 U.S.C. 154(b) by 7 days.

(21) Appl. No.: 17/514,571

(22) Filed: Oct. 29, 2021

(65) Prior Publication Data
US 2022/0210891 A1    Jun. 30, 2022

Related U.S. Application Data

(63) Continuation of application No. PCT/CN2021/108679, filed on Jul. 27, 2021.

(30) Foreign Application Priority Data

Dec. 31, 2020    (CN) .......................... 202011634595.8

(51) Int. Cl.
H05B 47/165    (2020.01)

(52) U.S. Cl.
CPC .................. *H05B 47/165* (2020.01)

(58) Field of Classification Search
CPC ............................ H05B 47/165; H05B 47/175
See application file for complete search history.

(56) References Cited

U.S. PATENT DOCUMENTS

2008/0140231 A1*    6/2008    Blackwell ............ H05B 47/155
                                                        700/90
2020/0363531 A1*    11/2020    Buys ...................... H05B 47/17

FOREIGN PATENT DOCUMENTS

| CN | 108966462 A | 12/2018 |
| CN | 109496042 A | 3/2019 |
| CN | 109788615 A | 5/2019 |
| CN | 110740545 A | 1/2020 |
| CN | 111901947 A | 11/2020 |
| CN | 112566322 A | 3/2021 |
| CN | 112637381 A | 4/2021 |
| JP | 2006120064 A | 5/2006 |

* cited by examiner

*Primary Examiner* — Daniel D Chang
(74) *Attorney, Agent, or Firm* — Muncy, Geissler, Olds & Lowe, P.C.

(57) ABSTRACT

Disclosed is a visualized light adjustment method and system. The method includes the steps of: S1. acquiring a light spot projection scenario of lights using an imaging device, and displaying the light spot projection scenario in real time by a display device; S2. selecting coordinates of a light spot on the display device using an input device, and inputting a desired light effect; and S3. controlling, by a console, the light corresponding to a physical address to generate a corresponding light effect, based on the selection by the input device and an association relationship between the coordinates of the light spot and a physical address of the light.

16 Claims, 2 Drawing Sheets

VISUALIZED LIGHT ADJUSTMENT METHOD AND SYSTEM

CROSS REFERENCE TO RELATED APPLICATIONS

The present application is a continuation of International Application No. PCT/CN2021/108679, filed on Jul. 27, 2021, which claims priorities from Chinese Patent Application No. 202011634595.8 filed on Dec. 31, 2020, all of which are hereby incorporated herein by reference.

TECHNICAL FIELD

The present invention relates to the technical field of stage lighting, and in particular, relates to a visualized light adjustment method and system.

BACKGROUND

At present, during the process of controlling stage lights, for the purpose of controlling a light spot, the stage light which emits the light spot needs to be known first, and in addition, a physical address of the stage light needs to be acquired. Based on this information, the light spot may be controlled by a console. First, when an intensity of ambient light is too strong, it is difficult to track, based on a light beam, the stage light which emits the light spot. Second, the physical address of the stage light generally needs to be memorized by an operator. However, the number of stage lights on a site is generally huge, and where a new site is constructed, and the physical addresses need to be memorized again. This process is cumbersome and difficult, which is not friendly to another operator in place of the original operator.

SUMMARY

To overcome at least one defect in the related art, the present invention provides a visualized light adjustment method. With this method, physical addresses of stage lights do not need to be memorized, and light adjustment may be achieved by directly selecting corresponding light spots on a display device, which is simple and convenient in operation.

According to the present invention, the visualized light adjustment method includes the steps of:

S1, acquiring a light spot projection scenario of lights using an imaging device, and displaying the light spot projection scenario in real time by a display device;

S2, selecting coordinates of a light spot on the display device using an input device, and inputting a desired light effect; and S3, controlling, by a console, the light corresponding to a physical address to generate a corresponding light effect, based on the selection by the input device and an association relationship between the coordinates of the light spot and the physical address of the light.

In the visualized light adjustment method according to the present invention, based on the association relationship between the coordinates of the light spot and the physical address of the light in the console, in the case that an operator selects the coordinates of a light spot in the display device using the input device, the light corresponding to the physical address is automatically associated, data of the light effect input using the input device is sent to the light corresponding to the physical address, and the light is controlled to generate the corresponding light effect. In this way, a mounting position of each of the lights and the corresponding physical address do not need to be memorized, and the operation is simple and convenient. Even another operator is still capable of normally performing the operation, and reconstruction of the stage still exerts no impact.

Specifically, in step S3, the console successively controls the lights with various physical addresses to change light spot states until the light spot state at the selected coordinates is changed, associates the coordinates of the light spot with the physical address, and then controls the light corresponding to the physical address to generate the corresponding light effect. The association relationship between the coordinates of the light spot in the display device and the physical address of the light does not need to be pre-stored. Instead, during normal use of the light, the association relationship may be acquired and stored. Where a light spot needs to be controlled, the physical address of the associated light only needs to be controlled.

The change of the light spot state refers to on and off of the light spot, and successively controlling, by the console, the lights with the various physical addresses to change the light spot states until the light spot state at the selected coordinates is changed includes broadcasting blanking of the lights with all the physical addresses, and then lighting up the lights one by one until the light at the selected coordinates is lit up. On-off changes of the light spot is the most apparent and is easily to analyzed, and thus a more accurate result may be acquired.

In response to controlling the light spot state of the light corresponding to a physical address to be changed, the console performs comparative analysis on the projection scenario acquired by the imaging device and a scenario prior to the change of the light spot state to determine whether the light spot state at the selected coordinates has been changed. By comparing two pictures, the console may quickly determine whether the light spot state in the projection scenario has been changed. Therefore, this technology is mature and achieves quick analysis.

When the lights with the various physical addresses are controlled by console to change the light spot states, the console skips over the physical addresses for which matching relationships have been established with the coordinates of the light spots. In this way, association between the coordinates of the light spot in the display device and the physical address of the corresponding light may be effectively quickened.

In the case that the light corresponding to a physical address has changed the light spot state whereas the light spot state at the selected coordinates has not been changed, the light spot state of the light corresponding to the physical address is restored to a state prior to the change. This prevents mutual interference caused between the light spots.

The association relationship between the coordinates of the light spot in the display device and the physical address of the light is pre-stored in the console. For example, the console successively controls the lights with the various physical addresses to change the light spot states thereof until the light spot states of the lights corresponding to all the physical addresses have been changed once, and based on the change of the light spot state in the light spot projection scenario acquired by the imaging device each time the light spot state of the light corresponding to a physical address is changed, the console may associate the coordinates of the light spot in the display device with the physical address of the corresponding light and store the association relationship. In this way, the association relationship may be directly invoked, and thus it is unnecessary to performing a paging operation each time a light spot is selected.

The method further includes step S4: changing an angle of the light corresponding to a physical address corresponding to the selected coordinates of the light spot, and inputting a new light effect using the input device, wherein the console records an angle parameter of the light corresponding to the physical address at each of angles and a light effect at the angle. The angle parameters of all the lights at the various angles and the data of the light effects under these angles are recorded, and the lights are controlled to act in a timing sequence. In this way, a light show is exhibited.

In step S4, the console tracks movement of the light spot of the light in the display device, and updates the coordinates of the light spot of the light corresponding to the physical address. In the case that a light spot moves, the console update in real time the coordinates of the light spot in the association relationship, such that even when the light spot moves, the association relationship is still effective.

According to the present invention, the light effect at least includes a change of at least one a color of the light spot, a shape of the light spot, a luminance of the light spot, an angle of the light spot, or a position of the light spot.

The coordinates of the light spot are selected in the form of a circle using the input device.

The present invention further provides a light adjustment system employing the visualized light adjustment method as described above. The system includes:

an imaging device configured to acquire a light spot projection scenario of a light;

a display device configured to present the light spot projection scenario in a visualization fashion;

an input device configured to select a light spot and input a light effect in the display device; and a console configured to control a light spot state of a light corresponding to an associated physical address based on the selection of the input device and the input light effect.

The display device is a touch screen. The touch screen can further act as the input device.

The display device automatically pops up one or more light effect types for selection by a user, when the input device has selected the light spot. The operation is simple and no complicated parameter needs to be input.

The console or the light pre-stores one or more light effect parameters, and the console directly invokes the one or more light effect parameters based on the selection of the input device.

The one or more light effect types are presented in a preview fashion. This is visual and easy to operate.

DETAILED DESCRIPTION

Figure 1:
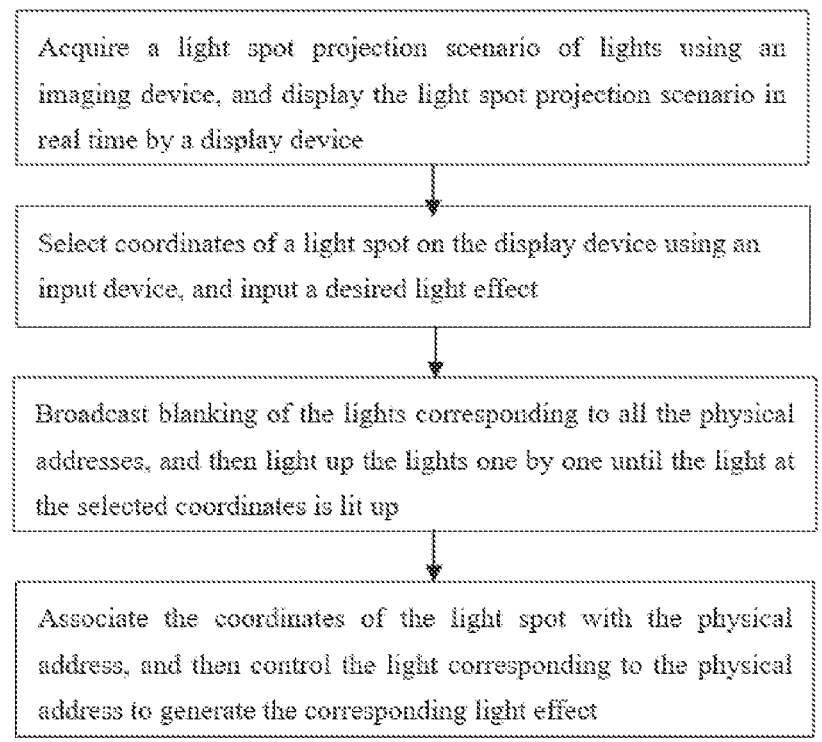
FIG. 1 is a schematic flowchart of a method according to one embodiment of the present invention.

The drawings are for illustration purpose only, but shall not be construed as limitations to the present invention. For better illustration of the following embodiments, some parts or components would be omitted, scaled up or scaled down in the drawings, which are not indicative of the practical sizes. For a person skilled in the art, it shall be understandable that some commonly known structures and description thereof are omitted for brevity. Positional relationships illustrated in the drawings are only for exemplary description, and shall not be construed as limiting the present invention.

Figure 2:
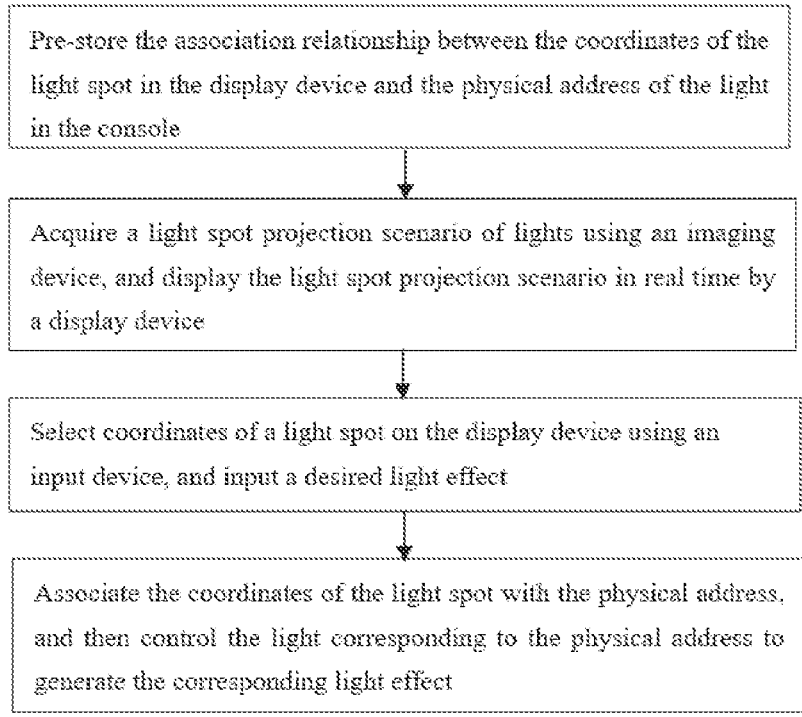
FIG. 2 is a schematic flowchart of the method according to another embodiment of the present invention.

As illustrated in FIG. 1 and FIG. 2, an embodiment of the present invention provides a visualized light adjustment method. The method includes the steps of:

S1. acquiring a light spot projection scenario of lights using an imaging device, and displaying the light spot projection scenario in real time by a display device;

S2. selecting coordinates of a light spot on the display device using an input device, and inputting a desired light effect; and S3. controlling, by a console, the light corresponding to a physical address to generate a corresponding light effect, based on the selection by the input device and an association relationship between the coordinates of the light spot and the physical address of the light.

In the visualized light adjustment method, based on the association relationship between the coordinates of the light spot and the physical address of the light in the console, wherein the association relationship may be pre-stored or established upon selection of a light spot, in the case that an operator selects the coordinates of a light spot in the display device using the input device, the light corresponding to the physical address is automatically associated, data of the light effect input using the input device is sent to the light corresponding to the physical address, and the light is controlled to generate the corresponding light effect. In this way, a mounting position of each of the lights and the corresponding physical address do not need to be memorized, and the operation is simple and convenient. Even another operator is still capable of normally performing the operation, and reconstruction of the stage still exerts no impact.

As illustrated in FIG. 1, in this embodiment, the association relationship between the coordinates of the light spot and the physical address of the light is established upon selection of coordinates of a light spot. In step S3, the console successively controls the lights corresponding to various physical addresses to change light spot states until the light spot state at the selected coordinates is changed, associates the coordinates of the light spot with the physical address, and then controls the light corresponding to the physical address to generate the corresponding light effect. The association relationship between the coordinates of the light spot in the display device and the physical address of the light does not need to be pre-stored. Instead, during normal use of the light, the association relationship may be acquired and stored. Where a light spot needs to be controlled, the physical address of the associated light only needs to be controlled.

In this embodiment, the change of the light spot state refers to on and off of the light spot, and successively controlling, by the console, the lights corresponding to the various physical addresses to change the light spot states until the light spot state at the selected coordinates is changed includes broadcasting blanking of the lights corresponding to all the physical addresses, and then lighting up the lights one by one until the light at the selected coordinates is lit up. On-off changes of the light spot is the most apparent and is easily to analyzed, and thus resulting in more accurate result.

In the present embodiment, in response to controlling the light spot state of the light corresponding to a physical address to be changed, the console performs comparative analysis on the projection scenario acquired by the imaging device and a scenario prior to the change of the light spot state to determine whether the light spot state at the selected coordinates has been changed. By comparing two pictures, the console may quickly determine whether the light spot state in the projection scenario has been changed. Therefore, this technology is mature and achieves quick analysis.

In the present embodiment, when the lights with the various physical addresses are controlled by console to change the light spot states, the console skips over the physical addresses for which matching relationships have been established with the coordinates of the light spots. In this way, association between the coordinates of the light spot in the display device and the physical address of the corresponding light may be effectively quickened.

In this embodiment, in the case that the light corresponding to a physical address has changed the light spot state whereas the light spot state at the selected coordinates has not been changed, the light spot state of the light corresponding to the physical address is restored to a state prior to the change. This prevents mutual interference caused between the light spots.

As illustrated in FIG. 2, in another embodiment, the association relationship between the coordinates of the light spot in the display device and the physical address of the light is pre-stored in the console. For example, the console successively controls the lights with the various physical addresses to change the light spot states thereof until the light spot states of the lights corresponding to all the physical addresses have been changed once, and based on the change of the light spot state in the light spot projection scenario acquired by the imaging device each time the light spot state of the light corresponding to a physical address is changed, the console may associate the coordinates of the light spot in the display device with the physical address of the corresponding light and store the association relationship. In this way, the association relationship may be directly invoked, and thus it is unnecessary to performing a paging operation each time a light spot is selected.

In this embodiment, the method further includes step S4: changing an angle of the light corresponding to a physical address corresponding to the selected coordinates of the light spot and inputting a new light effect by the input device, in which the console records an angle parameter of the light corresponding to the physical address at each of angles and a light effect at the angle. The angle parameters of all the lights at the various angles and the data of the light effects under these angles are recorded, and the lights are controlled to act in a timing sequence. In this way, a light show is exhibited.

In this embodiment, in step S4, the console tracks movement of the light spot of the light in the display device, and updates the coordinates of the light spot of the light corresponding to the physical address. In the case that a light spot moves, the console update in real time the coordinates of the light spot in the association relationship, such that even when the light spot moves, the association relationship is still effective.

In this embodiment, the light effect at least includes a change of at least one a color of the light spot, a shape of the light spot, a luminance of the light spot, an angle of the light spot, or a position of the light spot.

In this embodiment, the coordinates of the light spot are selected in the form of a circle using the input device. In another embodiment, the coordinates of the light spot are selected in the form of a dot using the input device.

Figure 3:
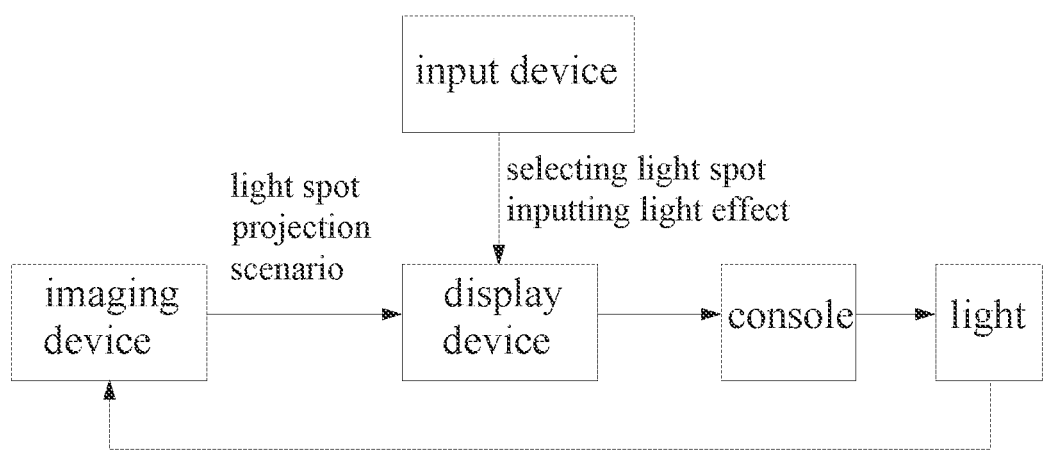
FIG. 3 is a block diagram of an adjustment system according to one embodiment of the present invention.

A light adjustment system employing the visualized light adjustment method as described above is further provided according to one embodiment. As illustrated in FIG. 3, the adjustment system includes:
an imaging device configured to acquire a light spot projection scenario of a light;
a display device configured to present the light spot projection scenario in a visualization fashion;
an input device configured to select a light spot and input a light effect in the display device; and
a console configured to control a light spot state of a light corresponding to an associated physical address based on the selection of the input device and the input light effect.

In this embodiment, the display device is a touch screen. The touch screen further acts as the input device. In other embodiments, the input device may also be a mouse or a keyboard.

In this embodiment, when the input device has selected the light spot, the display device automatically pops up one or more light effect types for selection by a user. The operation is simple and no complicated parameter needs to be input.

In this embodiment, the console or the light pre-stores one or more light effect parameters, and the console directly invokes the one or more light effect parameters based on the selection of the input device.

In this embodiment, the one or more light effect types are presented in a preview fashion. Playing a light effect animation on the display device is visual and easy to operate.

Obviously, described above are merely exemplary ones for illustrating the present invention, but are not intended to limit the implementation of the present invention. Persons of ordinary skills in the art may derive other modifications and variations based on the above embodiments. Embodiments of the present invention are not exhaustively listed herein. Any modification, equivalent replacement, or improvement made without departing from the spirit and principle of the present invention should fall within the protection scope of the present invention.

The invention claimed is:

1. A visualized light adjustment method, comprising the steps of:
    S1: acquiring a light spot projection scenario of lights using an imaging device, and displaying the light spot projection scenario in real time by a display device;
    S2: selecting coordinates of a light spot on the display device using an input device, and inputting a desired light effect; and
    S3: associating the selected coordinates of the light spot with a physical address of a light, and controlling, by a console, the light corresponding to the physical address to generate the desired light effect, based on the selection by the input device in step S2 and the association relationship between the coordinates of the light spot and the physical address of the light.

2. The method according to claim 1, wherein in step S3, the console successively controls the lights corresponding to various physical addresses to change light spot states of each light spot until the light spot state of the light spot at the selected coordinates is changed, associates the coordinates of the light spot at the selected coordinates with the physical address of the corresponding light, and then controls the light corresponding to the physical address to generate the desired light effect.

3. The method according to claim 2, wherein the change of the light spot states refers to on and off of the light spot, and the method that the console successively controls the lights with the various physical addresses to change the light spot states of each light spot until the light spot state of the light spot at the selected coordinates is changed comprises broadcasting blanking of the lights with all the physical addresses, and then lighting up the lights one by one until the light spot at the selected coordinates is lit up.

4. The method according to claim 2, wherein in response to controlling the light spot states of each light spot to be changed, the console performs comparative analysis on the projection scenario acquired by the imaging device and a scenario prior to the change of the light spot states of each light spot to determine whether the light spot state of the light spot at the selected coordinates has been changed.

5. The method according to claim 2, wherein when the lights with the various physical addresses are controlled by console to change the light spot states of each light spot, the console skips over the physical addresses for which matching relationships have been established with the coordinates of the light spots.

6. The method according to claim 2, wherein in a case that the light corresponding to a physical address at the non-selected coordinates has changed the light spot state, whereas the light spot state of the light spot at the selected coordinates has not been changed, the light spot state of the light corresponding to the physical address at the non-selected coordinates is restored to a state prior to the change.

7. The method according to claim 1, wherein the association relationship between the coordinates of the light spot in the display device and the physical address of the corresponding light is pre-stored in the console.

8. The method according to claim 1, further comprising step S4: changing an angle of the light corresponding to a physical address at the coordinates of the selected light spot and inputting a new light effect by the input device, wherein the console records an angle parameter of the light corresponding to the physical address at each of angles and a light effect at the angle.

9. The method according to claim 8, wherein in step S4, the console tracks movement of the light spot of the light in the display device, and updates the coordinates of the light spot of the light corresponding to the physical address.

10. The method according to claim 1, wherein the light effect at least comprises a change of at least one of a color of the light spot, a shape of the light spot, a luminance of the light spot, an angle of the light spot, or a position of the light spot.

11. The method according to claim 1, wherein the coordinates of the light spot are selected in a form of a circle using the input device.

12. A system employing the visualized light adjustment method as defined in claim 1, comprising:
an imaging device configured to acquire a light spot projection scenario of a light;
a display device configured to present the light spot projection scenario in a visualization fashion;
an input device configured to select a light spot and input a light effect in the display device; and
a console configured to control a light spot state of a light corresponding to an associated physical address based on the selection of the input device and the input light effect.

13. The system according to claim 12, wherein the display device is a touch screen, wherein the touch screen further acts as the input device.

14. The system according to claim 12, wherein when the input device has selected the light spot, the display device automatically pops up one or more light effect types for selection by a user.

15. The system according to claim 12, wherein the console or the light pre-stores one or more light effect parameters, and the console directly invokes the one or more light effect parameters based on the selection of the input device.

16. The system according to claim 12, wherein the light effect is presented in a preview fashion.

* * * * *